Patented Feb. 23, 1932

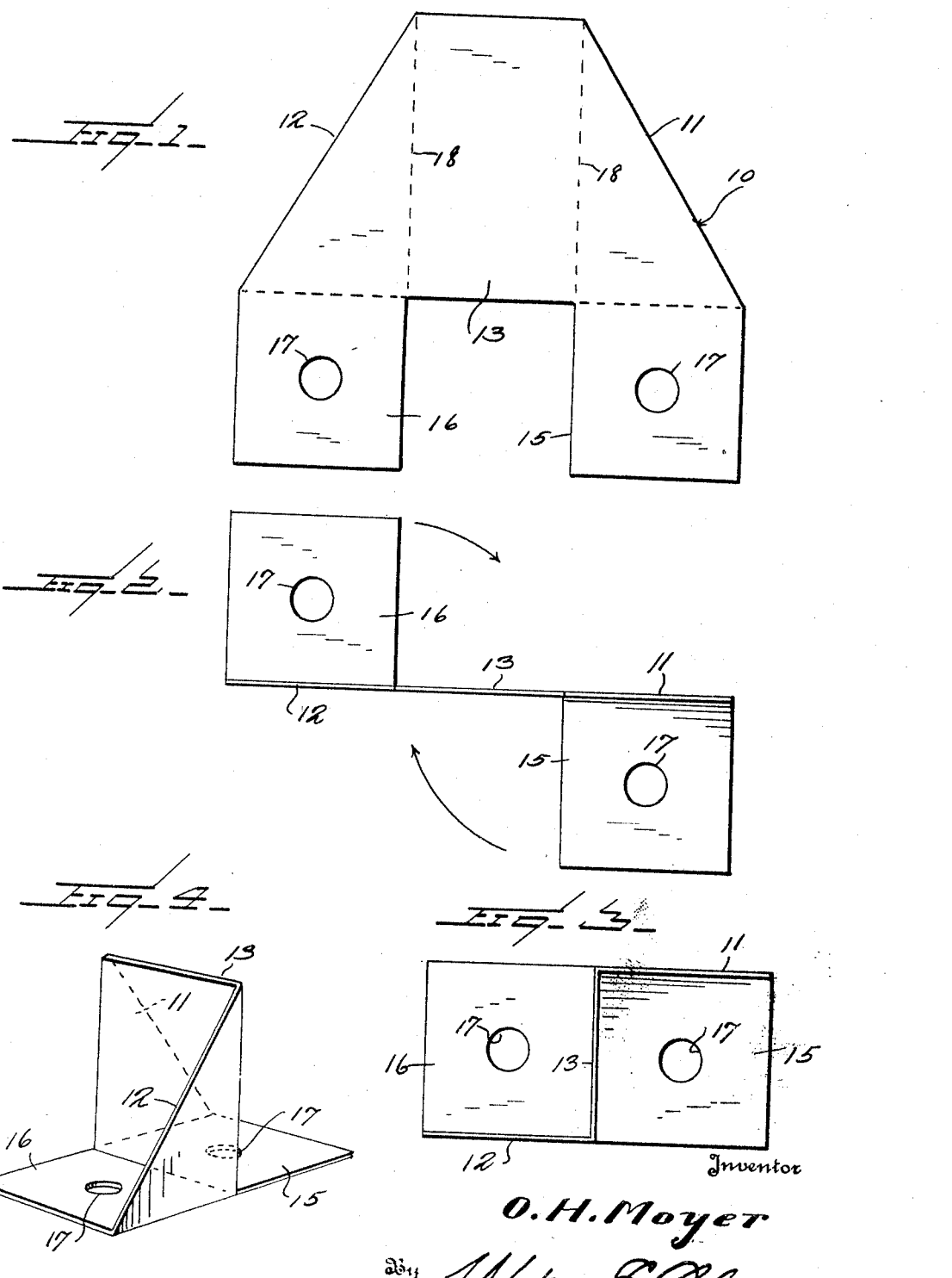

1,846,137

UNITED STATES PATENT OFFICE

ORVILLE H. MOYER, OF DANBURY, NEBRASKA

TRACTOR LUG

Application filed June 10, 1930. Serial No. 460,253.

The present invention relates to tractor lugs and has for an important object thereof the provision of a tractor lug which may be readily formed by stamping out of a sheet of metal which may be subsequently bent so as to form a lug which may be removably mounted on the periphery of a tractor wheel.

An object of this invention is to provide a lug of this character which may be formed of a single sheet of metal and which at the same time is provided with suitable bracing means or members for bracing the outstanding portion of the lug. A further object of this invention is to provide a tractor lug which is so constructed that the base portions thereof are adapted to place the outstanding portions under tension so that the securing members for the base portions will be placed under tension which will tend to prevent the ready loosening of the securing members from the tractor wheel.

The above and various other objects and advantages of this invention will in part be described in and in part be understood from the following detailed description of the present preferred embodiment, the same being illustrated in the accompanying drawings wherein:—

Figure 1 is a plan view of a sheet of metal showing the configuration of the lug constructed according to the preferred embodiment of this invention in flat or laid out form as stamped from the single sheet of metal;

Figure 2 is a top plan view showing the first step in the construction of the tractor lug;

Figure 3 is a top plan view of the completed lug; and

Figure 4 is a detail perspective view of the completed lug.

Referring to the drawings wherein like numerals of reference designate corresponding parts throughout the several views, the numeral 10 designates generally a blank sheet of metal which has been stamped out of a plate, the blank 10 having tapering side portions 11 and 12 and a substantially rectangular body portion 13. A pair of base members 15 and 16 are secured to the base of the tapering members 11 and 12 respectively and are provided with suitable apertures 17 therethrough which may be punched or drilled for the reception of suitable securing members in the form of bolts or the like.

In the construction of this tractor lug, the base plate members 15 and 16 are adapted to be bent at substantially right angles to the bracing members 11 and 12, the base member 15 being bent oppositely from the base member 16 as shown in Figure 2. When the base members 15 and 16 have been bent as disclosed in Figure 2, the bracing members 11 and 12 may be bent along the dotted line 18, the bracing member 11 being bent reversely or oppositely from the bracing member 12 as shown in Figure 3 so that when the blank as shown in Figure 3 so that when the blank plate 10 is in completed form the base members 15 and 16 will be in substantial alignment with each other, having one edge portion thereof contacting with one face of the upstanding body portion 13 of the lug.

In the mounting of the tractor lug herein disclosed on the periphery of a tractor wheel, a suitable securing member in the form of a bolt or the like may be extended through each of the openings 17 and tightened down so that the lower face of each of the base members 15 and 16 will be in tight engagement with the periphery of the tractor wheel. It is, of course, understood that the portion of the tractor wheel upon which the lug is mounted is formed on an arc and for this reason it will be necessary to place the base plates 15 and 16 under tension and coactively the bracing members 11 and 12 will slightly twist or tension the body 13. This tensioning of the lug will have the tendency of placing the securing bolts under tension so that in the movement of the tractor wheel over the ground the securing bolts will not readily become loosened, and it will therefore be unnecessary to use any locking nuts or other means for locking the bolt on the wheel.

It will be obvious from the foregoing that a simple and at the same time practical lug has been disclosed which may be readily constructed out of a single sheet of metal, being stamped out of the metal, and that when the stamped portion has been bent as herein disclosed a strong and durable lug has been provided.

It is, of course, understood that various changes and modifications may be made in the details of construction and design of the above specifically described embodiment of this invention without departing from the spirit thereof, such changes and modifications being restricted only by the scope of the following claim:

What is claimed is:—

A tractor lug of the character described comprising a body plate, a bracing member carried by the plate at each vertical edge thereof and base plates formed with the bracing members and disposed one on each side of the body plate and having edge portions thereof disposed closely adjacent each side of the body plate, said base plates being normally in alinement with each other and each having an aperture therethrough whereby to receive a securing bolt for securing the base plates to a tractor wheel, said base plates when in applied position being drawn out of alinement with each other and under tension and coactively tensioning said body plate and said bracing members.

In testimony whereof I hereunto affix my signature.

ORVILLE H. MOYER.